(12) United States Patent
Maltby

(10) Patent No.: US 9,178,341 B2
(45) Date of Patent: Nov. 3, 2015

(54) FISHING ADAPTER

(71) Applicant: Malory Maltby, Ardin (FR)

(72) Inventor: Malory Maltby, Ardin (FR)

( * ) Notice: Subject to any disclaimer, the term of this patent is extended or adjusted under 35 U.S.C. 154(b) by 142 days.

(21) Appl. No.: 13/667,101

(22) Filed: Nov. 2, 2012

(65) Prior Publication Data

US 2014/0124717 A1    May 8, 2014

(51) Int. Cl.
*H02G 1/08*    (2006.01)

(52) U.S. Cl.
CPC ................................ *H02G 1/083* (2013.01)

(58) Field of Classification Search
CPC ..................................... H02G 1/083
USPC .................. 254/134.3 FT, 134.3 R, 134.4
See application file for complete search history.

(56) References Cited

U.S. PATENT DOCUMENTS

| 3,697,188 A * | 10/1972 | Pope ............................. 408/230 |
| 7,478,794 B1 * | 1/2009 | Gohlke et al. ....... 254/134.3 FT |
| 2010/0258771 A1 * | 10/2010 | White .................... 254/134.3 R |

* cited by examiner

*Primary Examiner* — Lee D Wilson
*Assistant Examiner* — Nirvana Deonauth
(74) *Attorney, Agent, or Firm* — Invention To Patent Services; Alex Hobson

(57) ABSTRACT

The present invention concerns fishing adapters for pilling a cable or the like through a hole drilled in a wall or other structure and in one aspect comprises a drill bit connector to enable the adapter to be demountably attached to a drill bit and an item connector to enable a cable or other elongate/linear item to be attached to the adapter, wherein the adapter further has a rotary coupling between the drill bit connector and the item connector to permit the drill bit to rotate as the adapter with cable or other elongate/linear item attached is pulled through a drilled hole without significantly twisting said cable or other elongate/linear item.

21 Claims, 4 Drawing Sheets

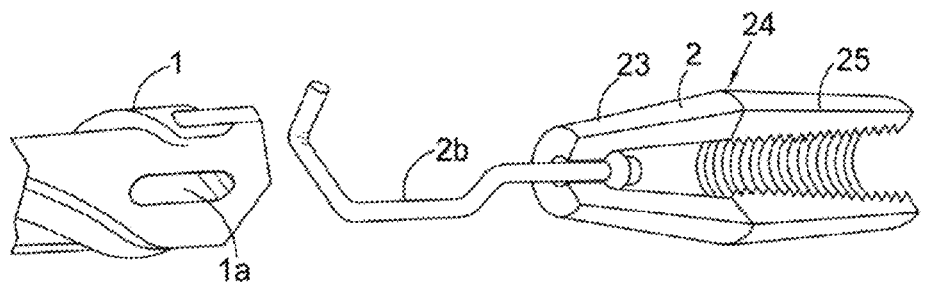
FIGURE 9
FIGURE 10A
FIGURE 10B
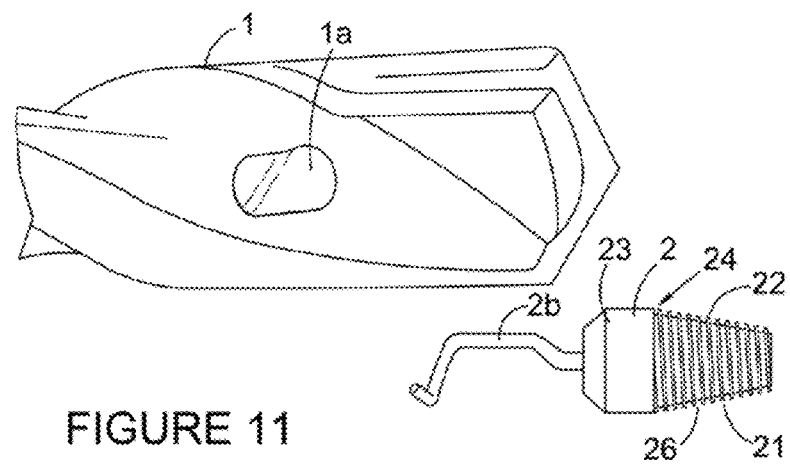
FIGURE 11
FIGURE 12

FISHING ADAPTER

FIELD OF THE INVENTION

The present invention concerns a fishing adapter, also known as a 'wire fishing adapter', being a device to connect a length of an item such as wire or cable (or in our case also pipe/conduit or other elongate/linear items) to a drill bit that has penetrated through a wall or other structure for pulling (a.k.a. 'fishing') the item back through the wall/structure when retracting the drill bit. In most cases the elongate/linear items to be 'fished' are, like wire and cable, not rigidly rectilinear but liable to bend and, therefore, difficult to push through a wall or other solid/semisolid structure and thus need to be pulled through.

BACKGROUND TO THE INVENTION

Fishing adapters of the type in question are used by workmen passing flexible electrical wire or cables through masonry, concrete or timber walls or through other solid or semi-solid structures/media. Fishing adapters are designed to help to reduce the time needed to install the wire or cables. Although such devices are known as fishing adapters, for the avoidance of doubt it should be understood that they are not generally used to randomly angle for items to hook onto. Instead the item to be pulled through the wall is deliberately placed on the hook when the hook projects through the wall.

By way of example, when installing cable from a satellite TV dish or TV aerial that is mounted to the outside of an external brick wall of a building it is necessary to pass the cable through a passageway that is drilled through the brick wall in order to reach the internal socket or to run the cable to the indoors receiver box or TV. A 300 mm or 400 mm long masonry drill bit or longer is required to penetrate fully through the thickness of most masonry walls and especially cavity walls and the drill bit should be of the type that is normally designed to vibrate as little as possible during hole creation, be as resistant as possible to snagging and be able to transport mortar or brick dust back out of the hole while remaining sharp while drilling into the brick or mortar. For the purposes of the present invention, however, the vibration-damping qualities of the drill bit are not particularly relevant. When the drill bit is being withdrawn, even if rotating under power and with hammer action selected, there is generally no vibration of the drill bit since the percussion hammer does not contact the drill bit.

Once the drill bit has penetrated to the far side of the wall, traditionally it would be withdrawn and a 'fishing tape' (or steel wire with a loop at the end) would be fed through the hole to the far side and the cable end attached to it to pull the cable on the fishing tape back through the hole. This is effective but inevitably somewhat time-consuming. More recently time-saving proposals have been made to modify the drill bit to have a notch to be able to hook the cable to the drill bit so that the cable can be pulled through the hole by the drill as the drill is retracted. This avoids the need to separately guide a 'fishing tape' through the hole first and can save valuable minutes of expensive work-man time. An example such modified drill bit arrangement is disclosed in UK Patent GB 23017888 and is useful but due to the location of the notch on the drill bit can weaken the drill bit tip and is also not fully secure and makes secure attachment of the cable difficult. A variant of the idea of using the drill bit itself as the fishing tool is, as exemplified in U.S. Pat. No. 4,033,703, to provide a fishing adapter that holds the cable end and mounts by a latch mechanism to the drill bit and thus couples the cable to the drill bit for pulling the cable through the hole.

Despite advances in masonry drill bit design and coatings, snagging can still be a significant problem and notably when seeking to retract the drill bit after the cable passage hole has been formed. When a rotating drill bit passes through certain materials, including porous materials such as soft brick and stone used in the construction of buildings, dust and hard particles of debris are created. This effect is amplified if a drill with a percussion facility is employed. This debris often binds in the flutes around the drill bit. Often it is necessary to run the drill in forward or reverse rotation in order to be able to release it from brick and mortar dust and debris in the passageway to be able to retract the drill. This is straightforward to do when the drill is being retracted on its own but not straightforward if the cable is coupled to the drill bit.

In the cases where the cable is hooked directly onto a modified drill bit or via an intermediate fishing adapter that is latched to the drill bit there is often no opportunity to run the drill since this will risk serious damage and entanglement of the cable. Thus with the existing modified drill bit arrangement and fishing adapter arrangement the workman has no option but to repeatedly insert and retract the running drill to clear all debris before seeking to attach the cable to the bit. The hoped for time-savings of the modified drill bit arrangement and fishing adapter arrangement are thus often lost in practice. Furthermore, for some types of walls and constructions such as those with loose rubble in-filled cavities any amount of preparative clearing of the hole/passageway before trying to couple the cable to the drill bit may be fruitless and necessitate the workman resorting to using the traditional fishing tape approach instead. Modern cavity walls filled with insulation material in the cavity can present a similar problem when trying to use the traditional fishing devices.

It is an object of the present invention to address these short-comings of the prior art in order to provide a fishing adapter arrangement that is practical for use in a wide range of situations, including rubble in-filled walls and similar, and which avoids the need for preparative clearing of the hole/passageway.

SUMMARY OF THE INVENTION

In accordance with a first aspect of the present invention there is provided a fishing adapter in combination with a drill bit wherein the fishing adaptor comprises a drill bit connector that is demountably attached to a drill bit in use and an item connector to enable a cable or other elongate/linear item to be attached to the adapter, wherein the adapter has a rotary coupling between the drill bit connector and the item connector to permit the drill bit to rotate as the adapter with cable or other elongate/linear item attached is pulled through a drilled hole without significantly twisting said cable or other elongate/linear item, the fishing adapter comprising a tubular body having the drill bit connector anchored therein and projecting therefrom at one end of the body and the item connector at the other end and with the rotary coupling therebetween, the drill bit connector comprising a hook that engages with a notch or hole in the drill bit, the notch or hole being proximate the tip end of the drill bit, wherein the notch or hole in the drill bit is elliptical, rectangular or otherwise elongate in the axial direction of the drill bit and is a through notch or through hole whereby the hook on the adapter is secured to the drill bit by insertion into the hole from one side and projecting out the other side of the drill bit and turning the hook until the stem/shank of the hook is substantially oriented in the axial direction of the drill bit.

Preferably the rotary coupling has a bearing surface of nylon or other robust low friction or self-lubricating material.

Preferably the drill bit has a through hole in the drill bit that is elliptical, rectangular or otherwise elongate in the axial direction of the drill bit. By this means a hook on the adapter may be easily and reliably secured to the drill bit by insertion into the hole from one side and turning the hook until the stem/shank of the hook is substantially oriented in the axial direction of the drill bit.

The drill bit connector preferably has an anchoring device comprising a bead or broadened tail end of the drill bit connector that serves to anchor the drill bit connector in the fishing adapter body. This suitably has a rounded surface to engage the bearing surface of the fishing adapter body. Where the bearing surface is of nylon or other robust low friction or self-lubricating material and the drill bit connector comprises a length of wire the anchoring means might simply be a loop of the wire or flattened and spread part of the wire. This latter arrangement simplifies the manufacture of the device.

Other aspects of the invention will become apparent from the description, drawings and claims that follow.

BRIEF DESCRIPTION OF THE DRAWINGS

A preferred embodiment of the present invention will now be described below by way of example only with reference to the accompanying drawings, in which:

FIG. 9 is a view similar to FIG. 4 and that illustrates the step of approaching the hook of FIG. 8A to the drill bit.

FIGS. 10A and 10B show the hook of FIG. 8A hooked through the elongate slot/through hole of the drill bit where in FIG. 10A the drill bit is a timber drill bit and in FIG. 10B the drill bit is a masonry drill bit.

FIG. 11 shows a slight variant of shape of the elongate slot/through hole of the drill bit.

FIG. 12 shows a variant of the fishing adapter that is primarily adapted to connect piping or other hollow conduit and where the fishing adapter body has a form with an external taper and that is externally threaded.

DESCRIPTION OF THE PREFERRED EMBODIMENT

Figure 1:
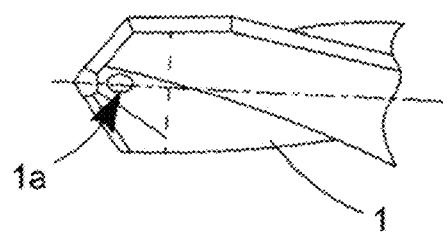
FIG. 1 is a perspective view of a drilling tip of a drill bit modified for use with a hooked wire or with the hook of the fishing adapter of the present invention.

Referring to FIG. 1, this illustrates a drill bit 1 modified to have a hole 1a in the end of the drill bit 1 close to the cutting tip and orthogonal to the longitudinal axis of the bit 1. The hole 1a is elliptical/elongate in the axial direction of the drill bit 1 as can be seen. This enables a hook to be inserted though the hole 1a, by insertion into the hole 1a from one side and turning the hook until the stem/shank of the hook is substantially oriented in the axial direction of the drill bit 1 to be secure in place for pulling behind the drill bit 1 as the drill bit 1 is retracted back through a hole drilled through a wall.

The drill bit 1 may be formed with the hole 1a during the manufacture of the bit 1, and in the case of spade or masonry drill bits, may be provided within the tungsten cutting part prior to that part being brazed in place. A hole may also be made in an existing drill bit with the use of a water jet cutter or plasma cutter. Preferably heat-producing cutting systems are avoided since high temperatures will reduce the hardness and life of the cutting edge of the original bit.

Where the item to be fed through the hole includes wire that can be bent over then that wire can be bent as a hook to attach it directly to the drill bit to be pulled through the hole by the drill bit as the drill is withdrawn. This arrangement is more efficient than the prior art since the hole 1a is proximate the tip and elongate enabling easier assembly and reliable securing of the wire. This basic arrangement may be used for simpler jobs where the wall or other solid or semi-solid structure/media is of dry, less obstructive materials such as wood and plasterboard.

For the more demanding jobs, including those that involve drilling through brick/masonry/stone walls it is generally preferred, and in some cases essential, to use the modified drill bit 1 together with a fishing adapter 2, as will now be described with reference to FIGS. 2 to 5.

Figure 2:
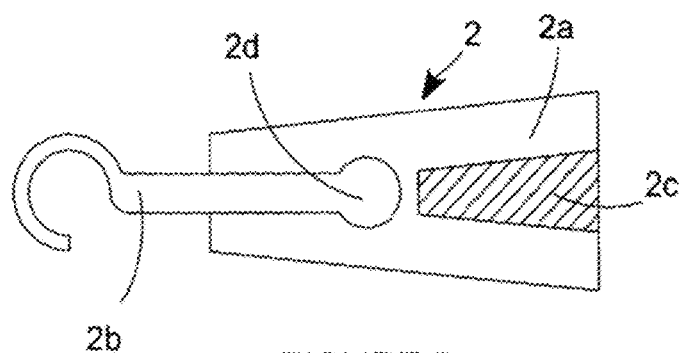
FIG. 2 is a schematic longitudinal sectional view of a fishing adapter of the present invention, having a hook as the drill bit connector at one end and having a threaded socket as the item connector at the other end.
Figure 3:
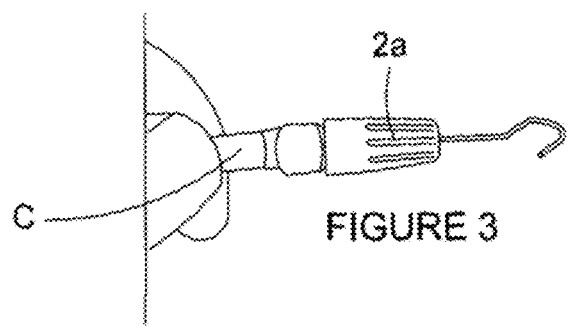
FIG. 3 is a perspective view of the fishing adapter and with a cable end fitted in the item connector socket.
Figure 4:
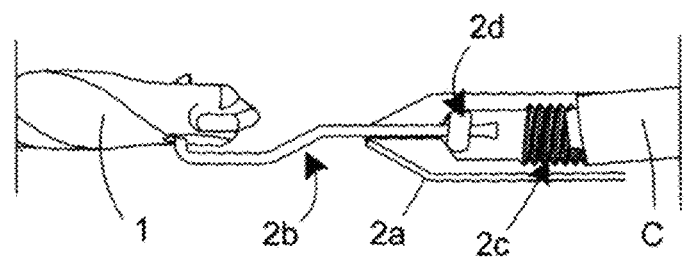
FIG. 4 is a part perspective part cutaway/sectional view of the fishing adapter similar to FIG. 3 but further showing the hook as the drill bit connector being hooked to the drill bit of FIG. 1 as in use, just prior to drawing the drill bit back through the hole in the wall.

As shown in FIG. 2 the fishing adapter 2 comprises a body 2a having a hook-form drill bit connector 2b mounted to it at one end and having at the other end a threaded socket 2c as item connector into which an end of the cable C (or other linear item to be pulled through the drilled hole) is inserted and held. The body 2a may be made from robust plastics, metals or other suitable materials and, as shown in FIGS. 2 and 5A-C, is formed—eg cast or moulded—to be externally of generally circular cylindrical shape and of a diameter that is slimmer than the cutting end of the modified drill bit 1. Indeed, the overall design of the body 2a is so slim that it is generally barely wider than the cable C (or other linear item to be pulled through the drilled hole) and, therefore, does not necessitate the selection of a larger drill bit size (diameter) to be used to make the hole through the wall than would normally be used for the size of the cable C.

Figure 5A:
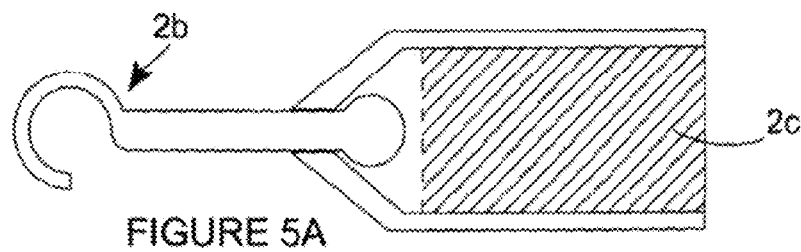
FIGS. 5A, 5B and 5C are schematic longitudinal sectional views of three further variants of the fishing adapter, the first in FIG. 5A having a broad non-tapered threaded socket as the item connector, the second in FIG. 5B having a broad non-tapered non-threaded socket with a resilient catch to permanently grip the cable or other item, while the third variant in FIG. 5C has a tapered threaded socket similar to the one in FIG. 2 but at its external surface is tapered only at the first end with the hook but otherwise is circular cylindrical for the majority of its length.
Figure 5B:
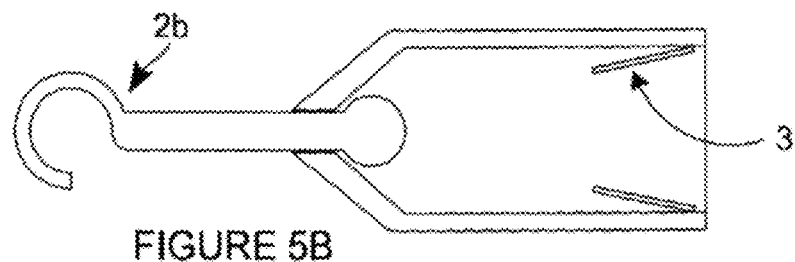
Figure 5C:
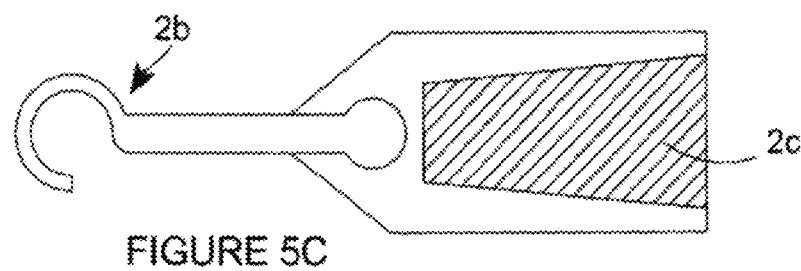

The body 2a is conical, overall as in FIG. 2, or at least at its leading end (the end that attaches to the drill bit 1) as shown in FIGS. 5A-5C in order to minimise resistance against debris when being pulled through the hole with the drill bit 1. The threaded socket 2c has an internal screw thread and tapers, narrowing towards the leading end of the body 2a and into this threaded socket 2c the leading end of cable C is pushed and twisted until tightly/reasonably securely fitted. The use of an internal taper of the bore of the threaded socket 2c enables the body 2a to connect with wires/cables C of a range of different diameters.

Conversely, referring to the variant form of the fishing adapter shown in FIG. 5A, since most cables C are available in defined standard diameters, the body 2a can be manufactured to cater for a specific cable size and need not have a tapered bore. Example uses for the fishing adapter 2 include installation of coaxial television cable, satellite dish aerial cable and multi strand telephone flex, amongst others. Tasks such as telephone connection or satellite dish installation only involve one size of cable and thus it is possible to provide a dedicated size of body 2a/socket 2c with an untapered bore designed only for that specification of wire. This allows for closer tolerances in the drill size used relative to the cable diameter, ie the wall of the body 2a is thin throughout its length and thus the body 2a may have a diameter close to that of the cable C and drill bit diameter. Typically, this might be just 2 mm resulting in a smaller drill hole and less overall damage to the wall/material being drilled.

Figure 7A:
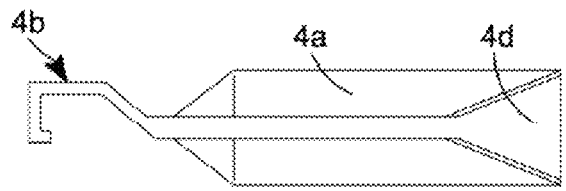
FIGS. 7A and 7B are schematic longitudinal sectional views of a variant of the fishing adapter that is adapted to connect piping or other hollow conduit and where the body has a form that is adapted to splay in the manner of a cavity anchor or rawl-plug to lock the body in the bore of the piping/conduit, as shown in FIG. 7B.
Figure 7B:
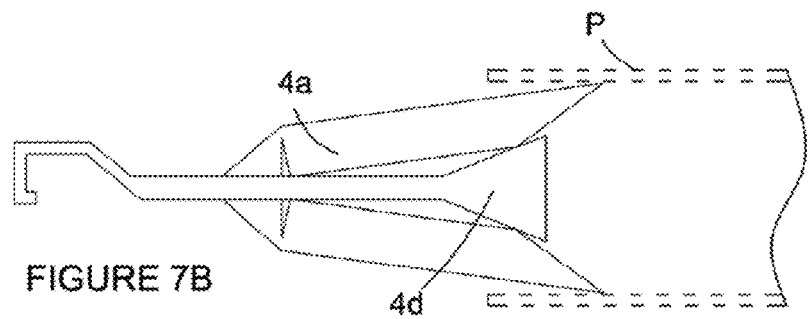

The fishing adapter 2 may, if desired, be configured to install flexible elongate items other than wire and cabling such as, for example, piping and electrical conduits. An arrangement suitable for these latter applications is shown in FIGS. 7A and 7B as will be described in further detail later.

For most embodiments the fishing adapter 2 may be reused if undamaged. In the variant shown in FIG. 5B, however, the fishing adapter 2 is designed as a disposable item. It has a spring loaded catch in the form of reverse-angled resilient fingers 3 to act as a non return grip. This is quicker and easier to use when a cable C or wire is inserted. The cable or wire would be cut free from the fishing adapter 2 after positioning and the latter thrown away. A benefit of this design is that a manufacturer or distributer will have a constant source of income from the need of the user to stock replacement parts. Again, a selection of sizes may be manufactured to match different drill sizes and types of varying diameters of wire and cable.

In all illustrated embodiments of the invention the leading end of the body 2a has the drill bit connector 2b hook rotatably mounted to the body 2a by a simple thrust bearing mount comprising a smooth ball-shaped head 2d and corresponding low friction seat 2e at the leading end of a cavity (eg the socket 2c) in the body 2a. This uniquely allows the body 2a and the drill bit connector 2b to rotate relative to each other. The body 2a thus generally need not revolve when the drill bit 1 is powered to slowly rotate for ease of withdrawal and hence the cable C attached to the body 2a will not rotate either despite the turning of the drill bit 1.

Provided that the distance between the drill bit 1 and the adaptor body 2a is small, there is little chance of any debris falling between the two parts and impeding the progress of the drill bit 1 and attached cable C. To reduce the gap between the drill bit 1 and the adaptor body 2a to the absolute minimum possible, the hook 2b is suitably formed in situ from a wire element that is already mounted in the fishing adapter body 2a.

Figure 6:
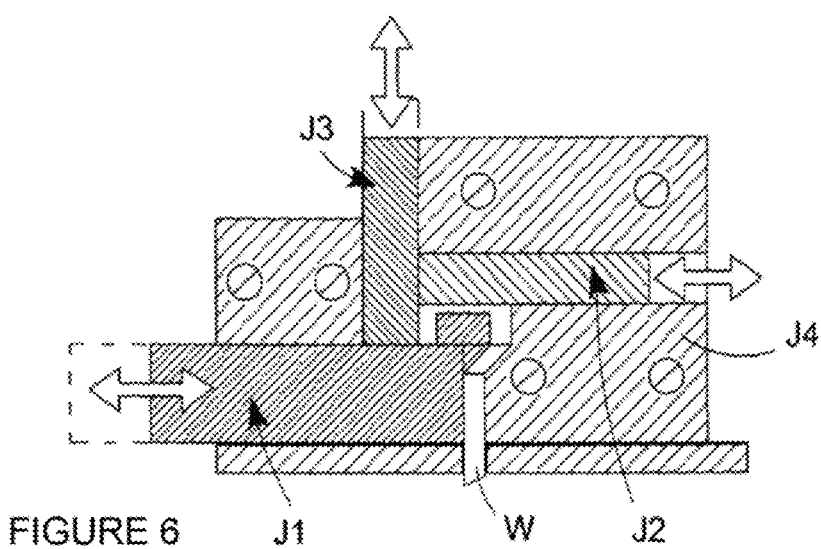
FIG. 6 is a schematic sectional view through a jig assembly suitable for forming a hook on wire in the fishing adapter once the wire for the hook has been anchored in the adapter body.

FIG. 6 illustrates an example simple jig assembly suitable for post-forming the hook 2b on a short protruding straight length of metal wire W the other end of which wire W has the thrust bearing head 2d that is rotatably pre-anchored in the fishing adapter body 2a. The jig is hereshown as comprising three moving blocks J1, J2 and J3 that operate successively to push the short wire length W against a static block J4 and each other to bend the wire W into the required hook shape. The first block J1 in a first move pushes the wire W against static block J4 to form two bends in the wire W and then the second moving block J2 pushes the wire W down onto J1 to form a flat top to the hook 2b, followed by the third moving block J3 pushing the wire W again down onto J1 at a rear shoulder of J1 to form the return to the hook 2b.

The fishing adapter of the present invention has been found to work very well in practice. For example, it has been used to pull coaxial TV cable through holes drilled through 300 mm thick rubble filled stone walls. Normally, this has been a very difficult task since the rubble tends to collapse within the tunnel like hole when the drill bit 1 is withdrawn. However, using the system of the present invention solves the problem. In each case a 400 mm×10 mm masonry drill bit 1 with tungsten tip modified to have the elongate hole 1a was drilled through the wall to reach the exterior and a fishing adapter of the invention was hooked to the hole 1a of the drill bit 1 and used to pull the cable C through the hole, while powering the drill to rotate to ease withdrawal. The system performed perfectly each time enabling the TV cable to be installed in just a few minutes.

Using the fishing adapter of the present invention the drill may be powered to rotate at moderate speed as it is withdrawn to clear debris. Should the operator or his/her employer consider that Health and Safety regulations demand that the drill be switched off before it is withdrawn, then the SDS chuck or standard chuck may be opened to release the bit and the electric-powered drill then replaced by a hand drill to turn the drill bit slowly to withdraw it. The drill bit used may suitably be a tungsten tipped masonry bit used with a percussion drill, a double helix twist drill, a standard jobber drill, a carpenters flat wood drill bit, an auger drill bit or a spade drill bit as used with glass and tiles and most tools designed to create a hole in a material.

Referring to FIGS. 7A and 7B, instead of being use for installing wire or cables C, the fishing adapter may be adapted for installing piping P or electrical conduits or the like. Here the body has a form that is adapted to splay in the manner of a cavity anchor or rawl-plug to lock the body in the bore of the piping/conduit, as shown in FIG. 7B. This modified fishing adapter 4 has a hook 4b like the cable-carrying fishing adapter 2 that allows it to be hooked onto the drill bit 1 that projects through the wall. However, the item-connector part of the body 4a is different. A wedge/conical shaped head 4d is provided at the thrust bearing mount of the hook 4b to the adapter body 4a. The body 4a is split and adapted to splay radially outwardly in the manner of a cavity anchor or ravelplug when the hook 4b is pulled on and turned whereupon the wedge/conical shaped head 4d acts to cam the body 4a to the splayed state, causing the splayed body 4a to dig into the bore of the pipe P to hold the pipe P to the adapter.

The tubular body 4a has a thin wall and the pipe P is held closely within it and this enables the system to be used with the slimmest possible drill bit—being only slightly larger than the pipe P being drawn through the masonry wall which results in the work needed to repair the damage produced by the drilling process being minimised.

As a further refinement to the system, a sealing/closure washer may be provided on the cable or pipe. The washer may be placed over the wire or pipe and then slipped along the wire or pipe until the wall is reached to remain there to stop the ingress of water and insects while adding a neat appearance to the finished task.

Figures 8A, 8B:
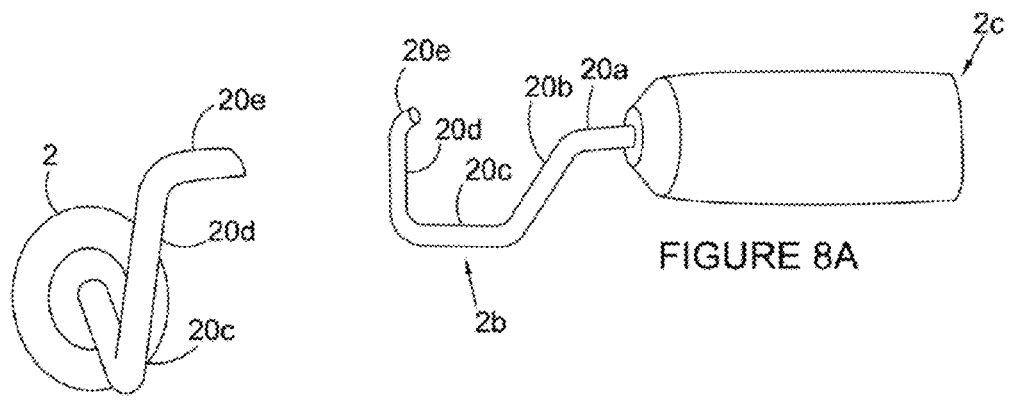
FIGS. 8A, 8B and 8C are views of a fishing adapter similar to that shown in FIGS. 2 and 4, having a socket at one end to receive cabling (this preferably is a threaded socket) and having a hook at the other end that is shaped to engage into an elongate slot on a drill bit, FIG. 8A being a side elevation view from a first side, FIG. 8B being substantially a front end elevation view and FIG. 8C being a side elevation view similar to 8A but with the adapter rotated about its axis slightly.
Figure 8C:
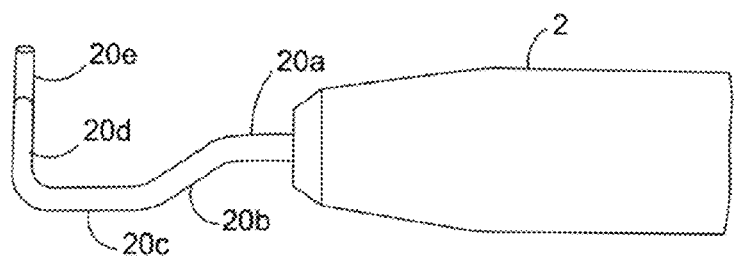

Turning to FIGS. 8A, 8B and 8C the fishing adapter shown there has a threaded socket 2c at one end to receive cabling and has a hook 2b at the other end that is shaped to engage into an elongate slot on a drill bit. The hook 2b has a shank/stem 20a that extends out from the fishing adapter body 2a axially of the body 2a and which then bends laterally at an angle away from the axis of the body 2a for a length 20b, then bends to run parallel to the axis of the body 2a for a length 20c and then bends back to run orthogonally towards the axis for a length 20d and finally bends again to run for a final length 20e that this time extends in a different plane from the rest of the hook 2b (ie in a different plane from lengths 20a-d which are all in a common plane). The final length 20e being in a different plane from the rest of the hook 2b allows the hook 2b to latch/catch against the exterior of the drill bit 1 once the hook 2b has been inserted into and through the elongate slot 1a of the drill bit 1 and the hook 2b shank/stem 20a tilted to be aligned/oriented in line with the longitudinal axis of the drill bit 1. It thus serves to allow simple hooking attachment with reliable securing of the hook in place. FIG. 9 illustrates the step of approaching the hook 2b to the elongate slot/through hole 1a of the drill bit 1 and FIGS. 10A and 10B show the hook 2b hooked through the elongate slot/through hole 1a.

In FIG. 10A the drill bit is a timber drill bit and in FIG. 10B the drill bit is a masonry drill bit. FIG. 11 shows a slight variant of shape of the elongate slot/through hole 1a of the drill bit 1, where the elongate slot/through hole 1a may have a shape similar to a Yale keyhole, ie with a broader diameter/size of opening at one end of the elongate slot compared to the other end.

In FIG. 12 the variant of the fishing adapter that is shown there is primarily adapted to connect piping or other hollow conduit to the adapter. To do so it has the fishing adapter body 2 configured with a form with an external taper reducing in diameter distally, in the direction away from the hook end of the fishing adapter body 2. The tapered part 21 of the body 2 is generally frusto-conical in form and has an external screw thread 22 or annular ridges/ribs around its external tapered surface (conical surface) 21 to grip to the internal bore of the piping or other hollow conduit to be connected.

Referring back to FIG. 9, the fishing adapter body 2 may be formed as a modular assembly having a proximal end portion 23 that carries the hook 2b and which at the distal end of the proximal end portion has a coupling 24, eg a short screw thread or a snap fit coupling, to couple to an interchangeable distal end portion 25. This interchangeable distal end portion 25 is the part into which the cable C inserts or onto which the pipe P fits. Thus the internal threaded socket distal end portion 25 for coupling cables C in FIG. 9 might be replaced by the external tapered, external threaded distal end portion 26 of FIG. 12.

I claim:

1. A fishing adapter in combination with a drill bit wherein the fishing adaptor comprises a drill bit connector that is demountably attached to the drill bit in use and an item connector to enable a cable or other elongate linear item to be attached to the adapter, wherein the adapter has a rotary coupling between the drill bit connector and the item connector to permit the drill bit to rotate as the adapter with cable or other elongate linear item attached is pulled through a drilled hole without significantly twisting said cable or other elongate linear item, the fishing adapter comprising a tubular body having the drill bit connector anchored therein and projecting therefrom at one end of the body and the item connector at the other end of the tubular body and with the rotary coupling therebetween, the drill bit connector comprising a preformed hook, the hook having a stem, that engages with a notch or hole in the drill bit, the drill bit having a tip end and the notch or hole being proximate the tip end of the drill bit, wherein the notch or hole in the drill bit is a slot that is elliptical, elongate rectangular or otherwise elongate in the axial direction of the drill bit and is a through notch or through hole whereby the hook on the adapter is secured to the drill bit by insertion into the hole from one side and projecting out the other side of the drill bit and turning, not bending, the hook until the stem of the hook is substantially oriented in the axial direction of the drill bit and thus ready for use.

2. The fishing adapter as claimed in claim 1, wherein the rotary coupling has a bearing surface of nylon or other robust low friction or self-lubricating material.

3. The fishing adapter as claimed in claim 1, wherein the drill bit connector has an anchoring device comprising a bead or broadened tail end of the drill bit connector that serves to anchor the drill bit connector in the fishing adapter body.

4. The fishing adapter as claimed in claim 3, wherein the drill bit connector anchoring device has a rounded surface to engage the bearing surface of the fishing adapter body.

5. The fishing adapter as claimed in claim 3, wherein the bearing surface is of nylon or other robust low friction or self-lubricating material and the drill bit connector comprises a length of wire, the anchoring device comprising a loop of the wire or flattened and spread part of the wire.

6. The fishing adapter as claimed in claim 1 wherein the body is generally tubular or circular cylindrical in form.

7. The fishing adapter as claimed in claim 1, wherein the item connector comprises a socket at one end of the fishing adapter tubular body.

8. The fishing adapter as claimed in claim 7, wherein the item connector is a threaded socket having a bore with an internal thread and the thread engages the item.

9. The fishing adapter as claimed in claim 8, suited to use for a defined diameter of wire or cable wherein the threaded socket is formed in the body and is parallel-sided and the body is generally circular cylindrical in external form and thin walled to present a slim profile.

10. The fishing adapter as claimed in claim 9, suited to use for varying diameters of wire or cable wherein the threaded socket is formed in the body and is tapered narrowing towards the drill bit connector end of the body.

11. The fishing adapter as claimed in claim 8, wherein the socket is formed in the body and has internal inward facing flexible strips or fingers positioned to create a one way locking grip.

12. The fishing adapter as claimed in claim 7, wherein the hook is formed while in place in the fishing adapter body from a wire element that is anchored in the fishing adapter' body and bent into shape by a jig assembly.

13. The fishing adapter as claimed in claim 1, wherein said elongate linear item is a pipe or conduit with an internal bore and the body is adapted to grip the internal bore of the pipe or conduit by splaying when prised apart by a wedge that is pulled by the hook or the body has a tapered exterior with a screw thread or annular ribs or ridges to grip the internal bore of a pipe or conduit.

14. The fishing adapter as claimed in claim 1, wherein the drill bit connector comprises a hook that is formed while in place in the fishing adapter body from a wire element that is anchored in the fishing adapter body and bent into shape by a jig assembly.

15. A fishing adapter in combination with a drill bit wherein the fishing adaptor comprises a drill bit connector that is demountably attached to the drill bit in use and an item connector to enable a cable or other elongate linear item to be attached to the adapter, wherein the adapter has a rotary coupling between the drill bit connector and the item connector to permit the drill bit to rotate as the adapter with cable or other elongate linear item attached is pulled through a drilled hole without significantly twisting said cable or other elongate linear item, the fishing adapter comprising a tubular body having the drill bit connector anchored therein and projecting therefrom at one end of the body and the item connector at the other end of the tubular body and with the rotary coupling therebetween, the drill bit connector comprising a preformed hook that engages with a notch or hole in the drill bit, the notch or hole being proximate the tip end of the drill bit, wherein the item connector comprises a socket at said end of the fishing adapter tubular body and receiving an end of the elongate linear item therein.

16. The fishing adapter as claimed in claim 15, wherein the item connector is a threaded socket having a bore with an internal thread and the thread engages the item.

17. The fishing adapter as claimed in claim 15 wherein the body is generally tubular or circular cylindrical in form.

18. The fishing adapter as claimed in claim 16, suited to use for a defined diameter of wire or cable wherein the threaded socket is formed in the body and is parallel-sided and the body is generally circular cylindrical in external form and thin walled to present a slim profile.

19. The fishing adapter as claimed in claim 18, suited to use for varying diameters of wire or cable wherein the threaded socket is formed in the body and is tapered narrowing towards the drill bit connector end of the body.

20. The fishing adapter as claimed in claim 15, wherein the socket is formed in the body and has internal inward facing flexible strips, or ridges or fingers positioned to create a one way locking grip.

21. The fishing adapter as claimed in claim 15, wherein the socket is formed in an end portion of the adapter that is demountable from a proximal portion of the adapter that carries the hook and may thereby be interchanged with a different end portion.

* * * * *